United States Patent
Scheuerman et al.

(10) Patent No.: US 9,776,676 B2
(45) Date of Patent: Oct. 3, 2017

(54) GUIDE RAIL FOR CRAWLER TRACK

(71) Applicant: Harnischfeger Technologies, Inc., Wilmington, DE (US)

(72) Inventors: Adam Scheuerman, Waukesha, WI (US); Joseph Brenny, Hartland, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 0 days.

(21) Appl. No.: 14/538,531

(22) Filed: Nov. 11, 2014

(65) Prior Publication Data

US 2015/0130268 A1    May 14, 2015

Related U.S. Application Data

(60) Provisional application No. 61/903,065, filed on Nov. 12, 2013.

(51) Int. Cl.
*B62D 55/08*    (2006.01)
*B62D 55/10*    (2006.01)
(Continued)

(52) U.S. Cl.
CPC .......... *B62D 55/10* (2013.01); *B62D 55/092* (2013.01); *B62D 55/15* (2013.01); *B62D 55/202* (2013.01); *B62D 55/26* (2013.01)

(58) Field of Classification Search
CPC ... B62D 55/15; B62D 55/202; B62D 55/0847
(Continued)

(56) References Cited

U.S. PATENT DOCUMENTS

| 2,452,921 A | 11/1948 | Gillespie |
| 3,053,579 A | 9/1962 | Trudeau |

(Continued)

FOREIGN PATENT DOCUMENTS

| AU | 2003100265 | 8/2003 |
| CN | 1218727 | 6/1999 |

(Continued)

OTHER PUBLICATIONS

First Office Action from the State Intellectual Property Office of China for Application No. 201410224901.9 dated Apr. 8, 2017 (13 pages).

*Primary Examiner* — Jeffrey J Restifo
(74) *Attorney, Agent, or Firm* — Michael Best & Friedrich LLP

(57) ABSTRACT

A crawler mechanism includes a frame, a track including a plurality of shoes coupled together and supported for movement relative to the frame along a direction of travel, a sprocket, and a guide rail. The frame includes a first end, a second end, a first side extending between the first end and the second end and proximate a support surface, and a second side. Each shoe includes an intermediate portion having a first hardness. The sprocket drives the plurality of shoes to move along the second side of the frame. The guide rail is coupled to the second side of the frame and includes a base having an outer surface and a coating bonded to the outer surface. The coating contacts the intermediate portion of the shoes as the shoes move along the second side of the frame, and the coating defines a second hardness less than the first hardness.

26 Claims, 9 Drawing Sheets

(51) Int. Cl.
*B62D 55/20* (2006.01)
*B62D 55/092* (2006.01)
*B62D 55/15* (2006.01)
*B62D 55/26* (2006.01)

(58) Field of Classification Search
USPC .......................................................... 305/116
See application file for complete search history.

(56) References Cited

U.S. PATENT DOCUMENTS

| | | | |
|---|---|---|---|
| 3,128,130 A | 4/1964 | Harris | |
| 3,165,364 A | 1/1965 | Hardman et al. | |
| 3,307,882 A | 3/1967 | McFayden | |
| 3,601,212 A | 8/1971 | Peterson et al. | |
| 3,680,928 A | 8/1972 | Kraschnewski et al. | |
| 3,721,476 A | 3/1973 | Andersson | |
| 3,913,986 A | 10/1975 | Schaffner | |
| 4,097,093 A * | 6/1978 | Shelby | B62D 55/08 305/125 |
| 4,139,240 A | 2/1979 | Profio et al. | |
| 4,175,797 A | 11/1979 | Krekeler | |
| 4,176,887 A * | 12/1979 | Alpers | B62D 55/08 305/106 |
| 4,262,972 A | 4/1981 | Falk | |
| 4,278,301 A | 7/1981 | Gregor et al. | |
| 4,391,341 A * | 7/1983 | Taghon | B62D 55/10 180/6.7 |
| 4,425,007 A | 1/1984 | Soeteber | |
| 4,572,588 A | 2/1986 | Wiesner et al. | |
| 4,583,791 A * | 4/1986 | Nagata | B62D 55/08 305/134 |
| 4,583,792 A | 4/1986 | Erlenmaier et al. | |
| 4,636,014 A | 1/1987 | Dennison et al. | |
| 4,673,050 A | 6/1987 | Zschocke | |
| 4,735,465 A | 4/1988 | Wiesner et al. | |
| 4,805,968 A | 2/1989 | Connerley | |
| 5,072,800 A | 12/1991 | Price | |
| 5,853,233 A | 12/1998 | Turner | |
| 5,941,326 A * | 8/1999 | Fleuchaus | B62D 55/0847 180/9.1 |
| 6,012,848 A * | 1/2000 | Michioka | F16C 29/0602 384/43 |
| 6,017,103 A | 1/2000 | Villard | |
| 6,543,863 B1 | 4/2003 | Hannan et al. | |
| D484,149 S | 12/2003 | Hannan et al. | |
| 6,659,573 B1 | 12/2003 | Knecht et al. | |
| 6,702,406 B2 * | 3/2004 | Yoshida | B62D 55/14 305/100 |
| D496,051 S | 9/2004 | Yoshida | |
| 6,820,948 B2 | 11/2004 | Katoh | |
| 6,929,335 B2 | 8/2005 | Colwell et al. | |
| 7,410,225 B1 | 8/2008 | Marzetta et al. | |
| D588,167 S | 3/2009 | Shimozono | |
| D588,168 S | 3/2009 | Shimozono | |
| 7,530,650 B2 | 5/2009 | Hannan et al. | |
| 7,703,863 B2 | 4/2010 | Koolhiran | |
| D618,255 S | 6/2010 | Abiko | |
| 7,854,483 B2 | 12/2010 | Bordini | |
| 7,866,767 B2 | 1/2011 | Lemaire et al. | |
| D655,724 S | 3/2012 | Shimozono | |
| 8,272,701 B2 | 9/2012 | Mulligan | |
| 2001/0054844 A1 * | 12/2001 | Rutz | B62D 55/0847 305/116 |
| 2003/0141760 A1 | 7/2003 | Yamamoto | |
| 2006/0181151 A1 * | 8/2006 | Wodrich | B62D 55/15 305/201 |
| 2010/0051358 A1 * | 3/2010 | Inaoka | B62D 55/088 180/9.1 |
| 2011/0048817 A1 * | 3/2011 | Bessette | B62D 55/084 180/9.62 |
| 2011/0221266 A1 | 9/2011 | Bonnetain et al. | |
| 2013/0313891 A1 | 11/2013 | O'Neill | |
| 2014/0346856 A1 * | 11/2014 | Colwell | B62D 55/26 305/185 |
| 2015/0130268 A1 * | 5/2015 | Scheuerman | B62D 55/15 305/116 |
| 2015/0158536 A1 * | 6/2015 | Takagi | B62D 55/12 305/201 |
| 2015/0197294 A1 * | 7/2015 | Hakes | B62D 55/202 305/142 |

FOREIGN PATENT DOCUMENTS

| | | |
|---|---|---|
| CN | 1289296 | 3/2001 |
| CN | 101513901 | 8/2009 |
| JP | 3106814 | 11/2000 |
| JP | 2014028556 | 2/2014 |
| WO | 2014027530 | 2/2014 |

* cited by examiner

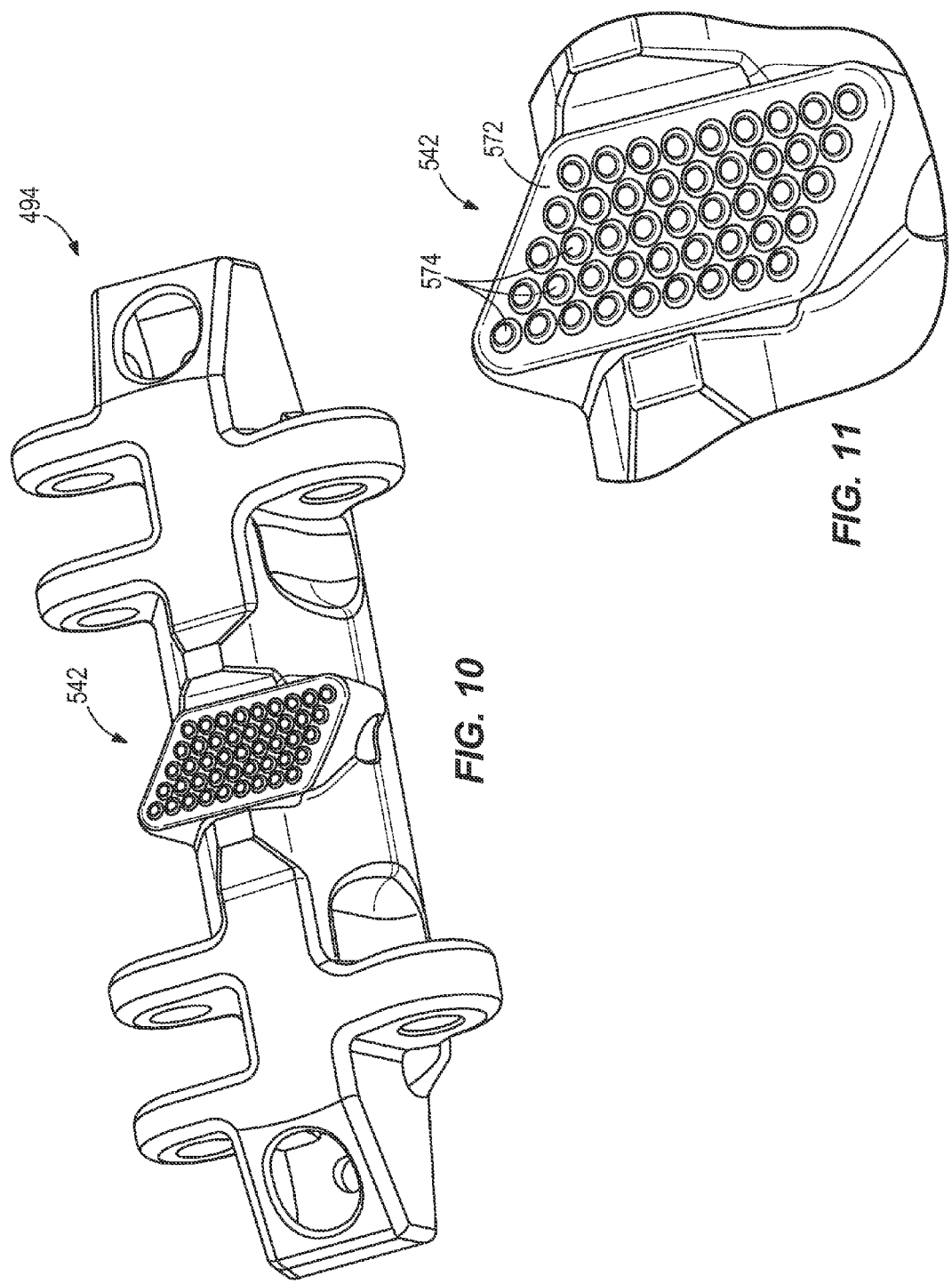

GUIDE RAIL FOR CRAWLER TRACK

CROSS-REFERENCE TO RELATED APPLICATIONS

The present application claims the benefit of, prior-filed U.S. Provisional Application Ser. No. 61/903,065, filed Nov. 12, 2013, the entire contents of which is incorporated herein by reference.

BACKGROUND

The present invention relates to industrial machines and, in particular, to a guide rail for a crawler of a mining machine.

Conventional earth-moving machines, such as mining shovels and excavators, include crawler mechanisms for moving the machine over the ground. The crawler mechanism includes an articulated track composed of multiple links or shoes coupled together to form a continuous loop. The shoes engage the ground and engage a row of rollers along a roller path as the track is driven. The weight of the machine and any loads supported by the machine are transmitted through the rollers to the shoes, thereby causing the shoes to wear down and/or deform over time.

SUMMARY

In one aspect, a crawler mechanism includes a frame, a track including a plurality of shoes coupled together and supported for movement relative to the frame along a direction of travel, a sprocket, and a guide rail. The frame includes a first end, a second end, a first side extending between the first end and the second end and proximate a support surface, and a second side. Each shoe includes a first end, a second end, and an intermediate portion positioned between the first end and the second end, the intermediate portion having a first hardness. The sprocket is rotatably coupled to the first end of the frame and drives the plurality of shoes to move along the second side of the frame. The guide rail is coupled to the second side of the frame and includes a base having an outer surface and a coating bonded to the outer surface. The coating contacts the intermediate portion of the shoes as the shoes move along the second side of the frame, and the coating has a second hardness less than the first hardness.

In another aspect, a crawler mechanism includes a frame, a first sprocket supported for rotation relative to the frame, a second sprocket, a plurality of rollers rotatably coupled to a lower portion of the frame, a track including a plurality of shoes coupled together, and a guide rail assembly. The frame includes a first end and a second end. The second sprocket is rotatably coupled to the second end of the frame. The rollers are aligned with one another such that all of the rollers rotate in a common plane. The track is driven by at least one of the first sprocket and the second sprocket for movement in a direction parallel to the common plane of the rollers. The track defines an upper run and a lower run, and the lower run is positioned adjacent the rollers. Each shoe includes a wear portion contacting the rollers as the shoe moves along the lower run. The guide rail assembly is coupled to the frame and positioned adjacent the upper run of the track. The guide rail assembly includes a base having an outer surface and a coating bonded to the outer surface. The coating engages the wear portion of each shoe as the shoe moves along the upper run.

In yet another aspect, a frame for a crawler mechanism includes a first end supporting a first sprocket for driving a continuous track, a second end supporting a second sprocket, a first side, and a guide rail assembly. The first side extends between the first end and the second end and is positioned proximate a support surface. The first side includes a plurality of rollers supported for rotation, and the rollers are aligned with one another such that all of the rollers rotate in a common plane extending between the first end and the second end. The guide rail assembly defines a second side extending at least partially between the first sprocket and the second sprocket, and the guide rail assembly includes a base having an outer surface and a coating bonded to the outer surface.

Other independent aspects of the invention will become apparent by consideration of the detailed description and accompanying drawings.

BRIEF DESCRIPTION OF THE DRAWINGS

FIG. 10 is a perspective view of a crawler shoe according to another embodiment.
FIG. 11 is an enlarged perspective view of a portion of the crawler shoe of FIG. 10.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

DETAILED DESCRIPTION

Figure 1:
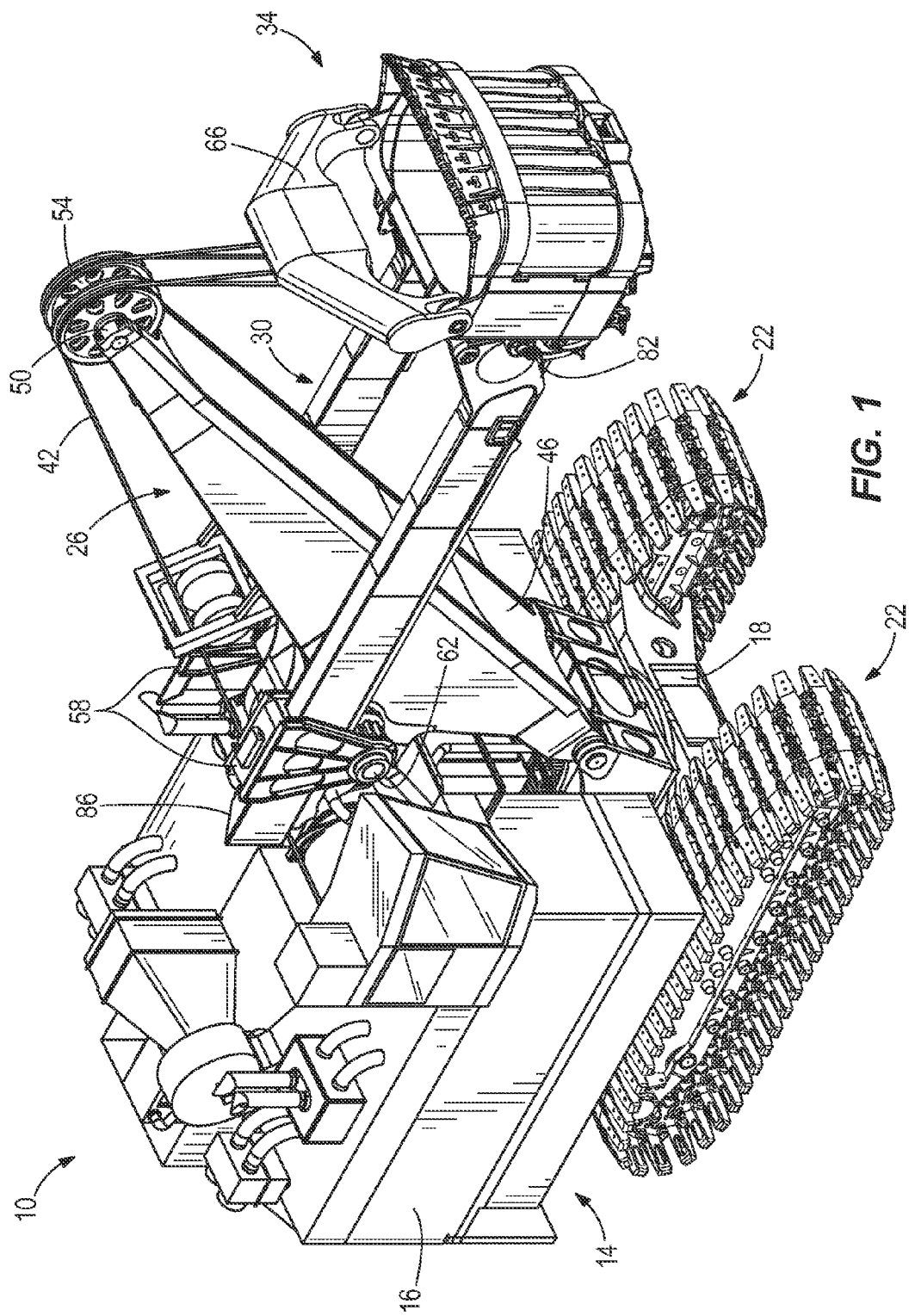
FIG. 1 is a perspective view of a mining shovel.

FIG. 1 illustrates an earthmoving machine, such as a mining shovel 10, including a frame 14 supporting a boom 26, an elongated member or handle 30, and an attachment or dipper 34 coupled to the handle 30. The frame 14 includes an upper portion 16 that is supported by an undercarriage 18 having crawlers 22. The upper portion 16 supports a hoist drum (not shown) for reeling in and paying out a cable or hoist rope 42. The boom 26 includes a first end 46 coupled to the upper portion 16 of the frame 14, a second end 50 opposite the first end 46, a boom sheave 54, a saddle block 58, and a shipper shaft 62. The boom sheave 54 is coupled to the second end 50 of the boom 26 and guides the rope 42 over the second end 50. The saddle block 58 is rotatably coupled to the boom 26 by the shipper shaft 62, which is positioned between the first end 46 and the second end 50 of the boom 26. The shipper shaft 62 extends through the boom 26 in a direction that is transverse to a longitudinal axis of the boom 26. The hoist rope 42 is coupled to the dipper 34 by a bail 66, and the dipper 34 is raised or lowered as the hoist rope 42 is reeled in or paid out, respectively, by the hoist drum.

The handle 30 includes a first end 82 and a second end 86. The second end 86 is movably received in the saddle block 58, and the handle 30 passes through the saddle block 58 such that the handle 30 is capable of rotational and translational movement relative to the boom 26. The saddle block 58 is rotatable relative to the boom 26 about the shipper shaft 62, and the handle 30 rotates relative to the boom 26 while the handle 30 remains in the saddle block 58.

Figure 2:
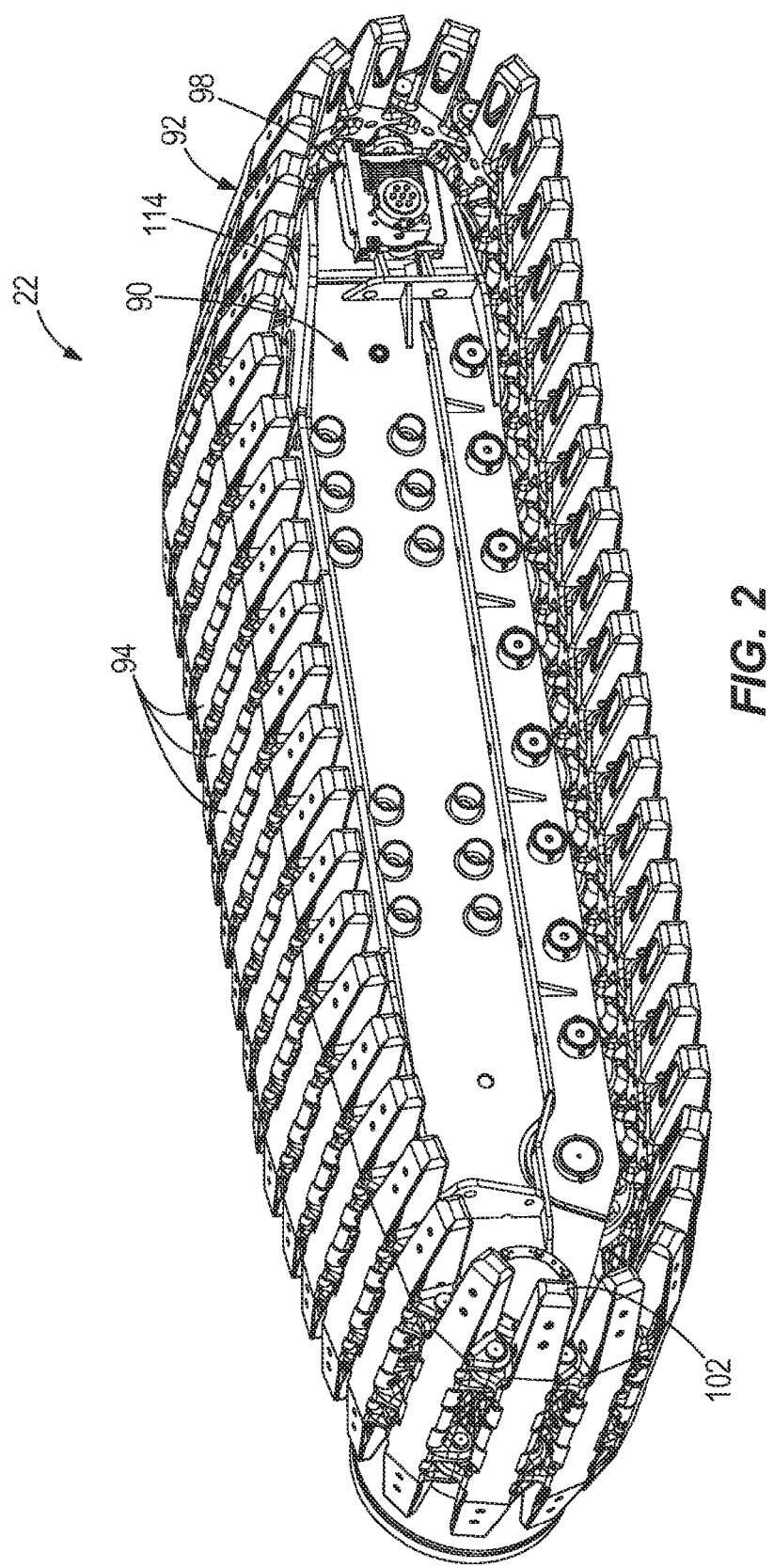
FIG. 2 is a perspective view of a crawler.
Figure 3:
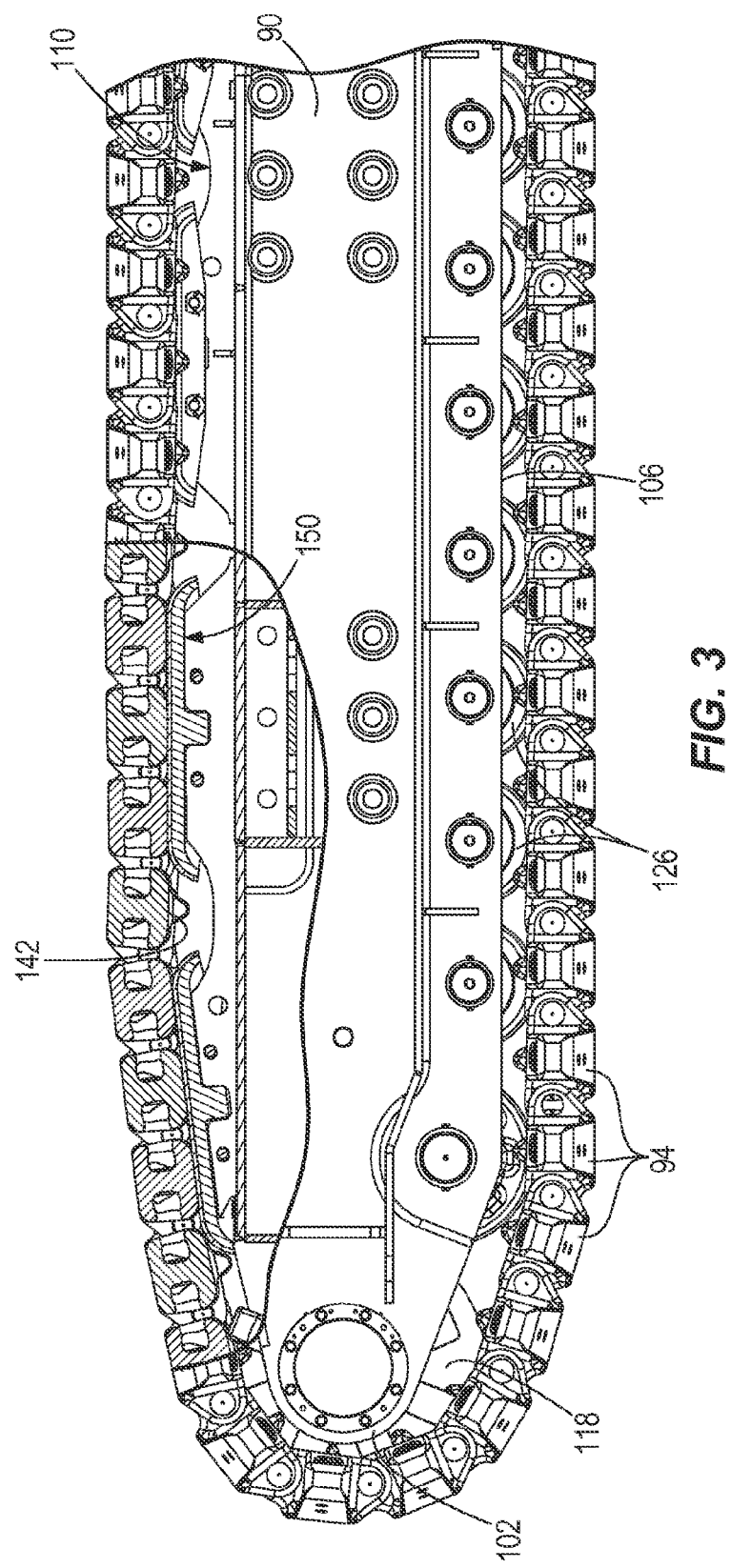
FIG. 3 is a side view of a portion of the crawler of FIG. 2.

As shown in FIGS. 2 and 3, each crawler 22 includes a track frame 90 and a track 92 including links or shoes 94 coupled together to form an articulated, continuous loop. The track frame 90 includes a first end 98, a second end 102, a first or lower portion 106, and a second or upper portion 110. In the illustrated embodiment, a first sprocket 114 (FIG. 2) is supported for rotation at the first end 98, and a second sprocket 118 (FIG. 3) is supported for rotation at the second end 102 of the frame 90. At least one of the sprockets 114, 118 is driven by a motor (not shown). The sprockets 114, 118 engage the crawler shoes 94 (e.g., by teeth extending into spaces between the shoes 94), thereby driving the shoes 94 around the perimeter of the track frame 90 in a continuous loop. The track 92 defines a first or lower run proximate the ground and a second or upper run extending along the upper portion 110 of the frame 90. As the shoes 94 move along the lower run, the shoes 94 engage the ground to move the machine 10 with respect to the ground.

Figure 4:
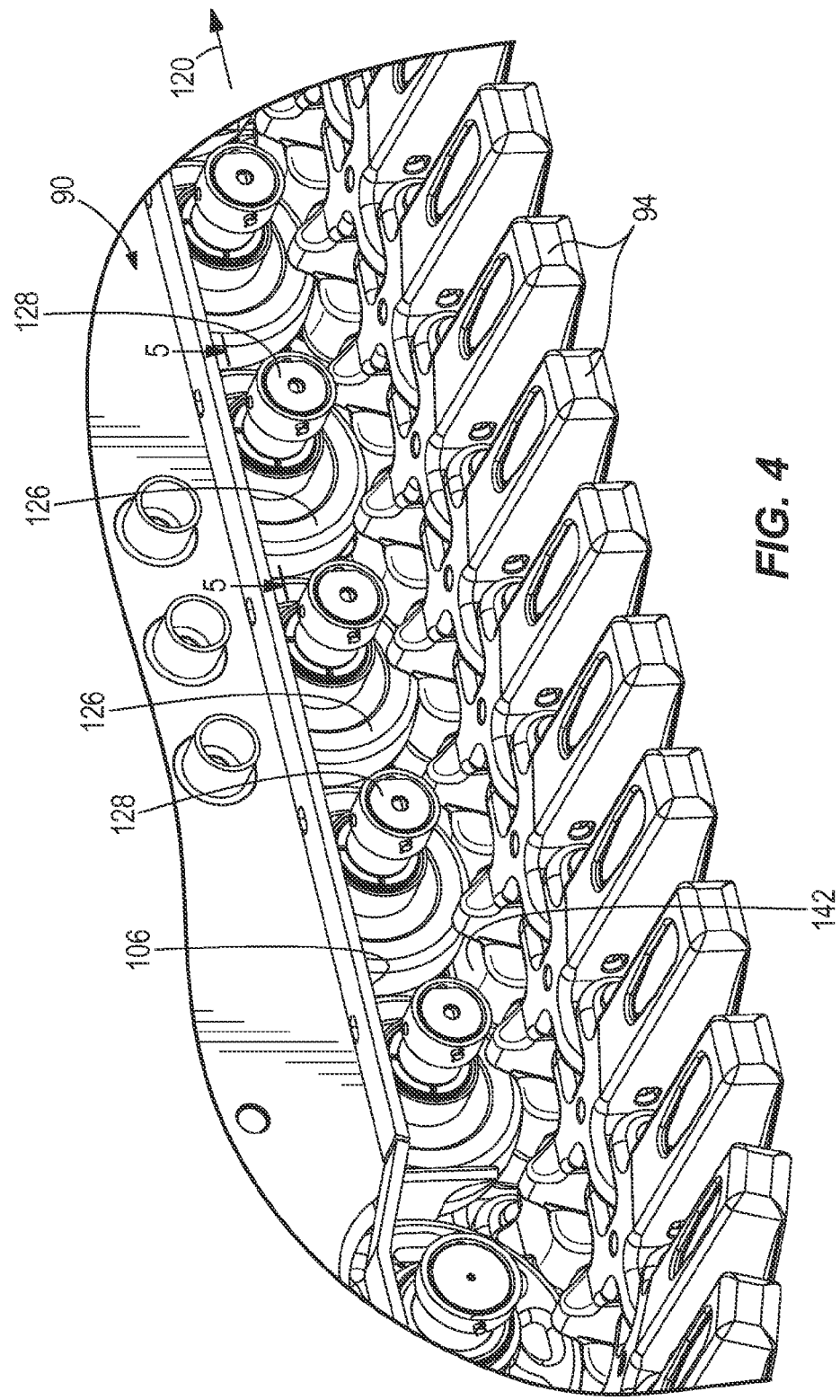
FIG. 4 is an enlarged perspective view of a portion of the crawler of FIG. 2.
Figure 5:
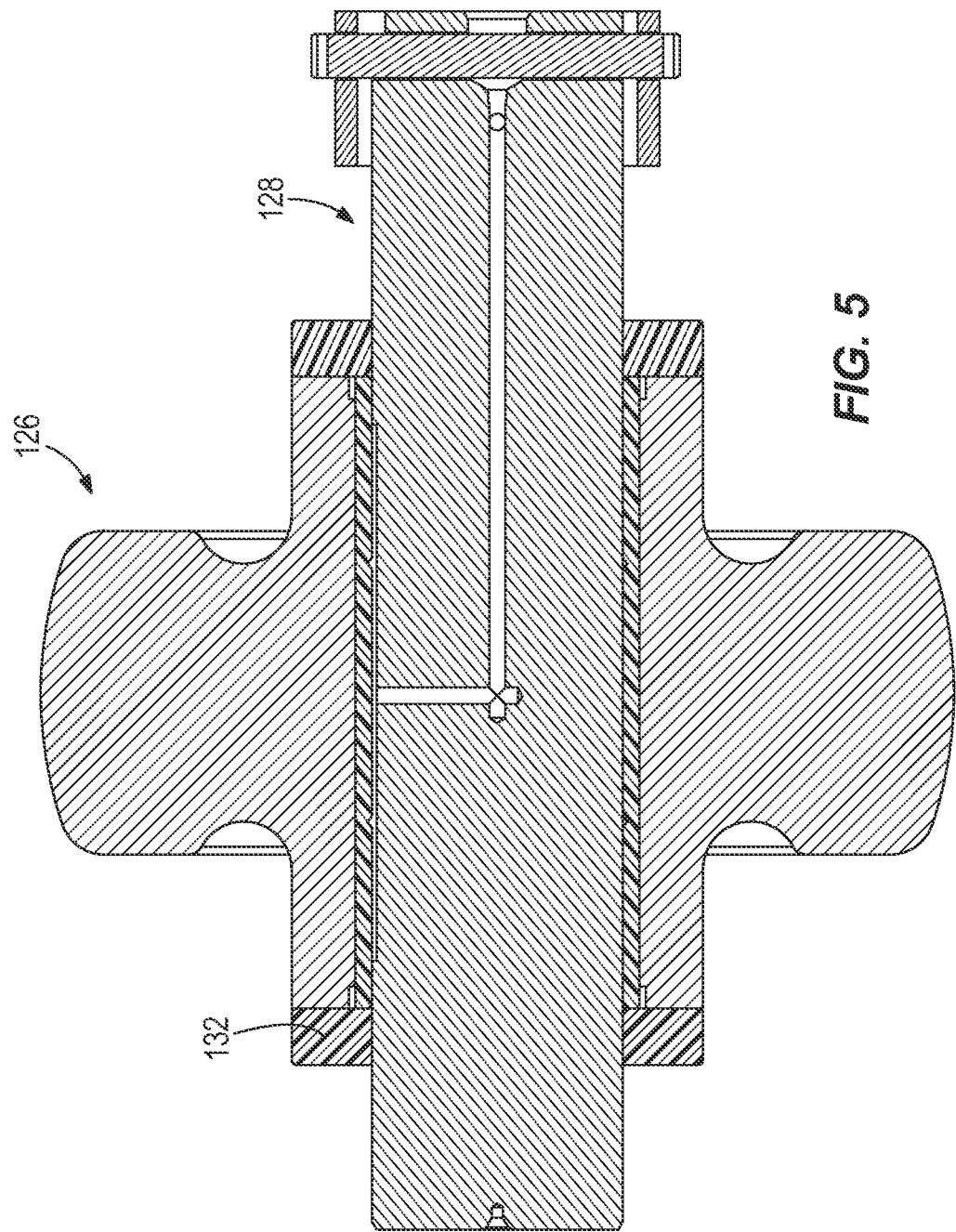
FIG. 5 is a section view of a roller viewed along section 5-5 of FIG. 4.

As shown in FIGS. 3 and 4, rollers 126 are rotatably coupled to the lower side 106 of the frame 90. The rollers 126 are aligned with one another such that all of the rollers 126 rotate in a common plane. Stated another way, the rollers 126 are aligned along a direction of travel 120 (FIG. 4) of the shoes 94. As shown in FIG. 5, each roller 126 is supported for rotation about a pin 128 defining an axis of rotation perpendicular to the direction of travel of the shoes 94. In the illustrated embodiment, a thrust washer 132 is positioned between the outer surface of the pin 128 and the inner bore of the 126.

Figure 6:
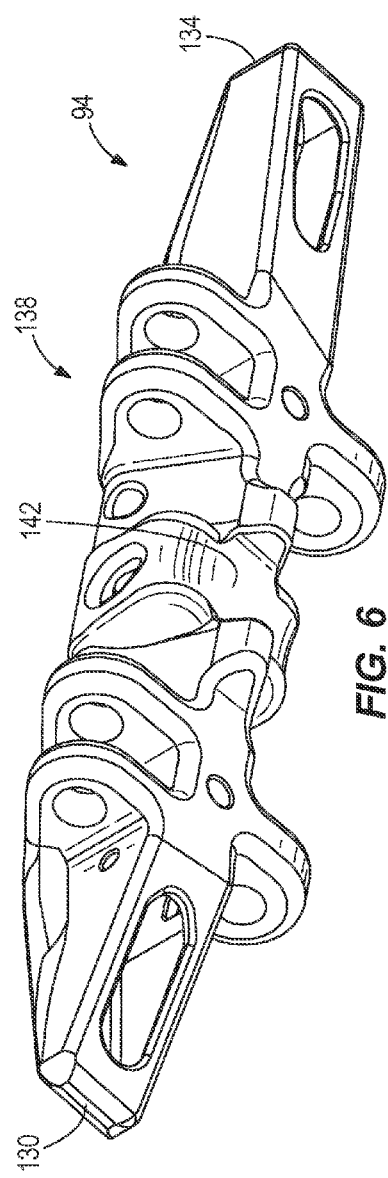
FIG. 6 is a perspective view of a crawler shoe.

Referring now to FIG. 6, each shoe 94 includes a first end 130, a second end 134, and an intermediate portion 138 positioned between the first end 130 and the second end 134. The shoes 94 are driven in a direction that is generally perpendicular to a line drawn between the first end 130 and the second end 134. The intermediate portion 138 includes a wear surface or roller path area 142 that contacts the rollers 126 as the shoes 94 are driven along the lower run of the track 92. The weight of the machine and any other loads supported by the machine 10 are transmitted through the rollers 126 to the shoes 94 in the lower run. In one embodiment, the compressive load exerted on the shoes 94 by the rollers 126 work hardens the shoes 94 at least during a predetermined period after installation of the shoes 94.

In one embodiment, the shoes 94 are formed from manganese or a manganese alloy and undergo a period of work hardening to increase the hardness of the shoes 94 to a desired level. In one embodiment, the contact between the rollers 126 and the roller path area 142 of each crawler shoe 94 work-hardens the shoe 94 during a period of operation after the shoe 94 is installed. The shoes 94 are work-hardened by the roller 126 where the primary loads are exerted, causing the shoes 94 to attain a higher hardness and thereby extending the overall life of the crawler 22 and its components. In one embodiment, the work hardening period for each shoe 94 takes place during the first 200-300 hours of operation on the crawler shoe 94.

Figure 7:
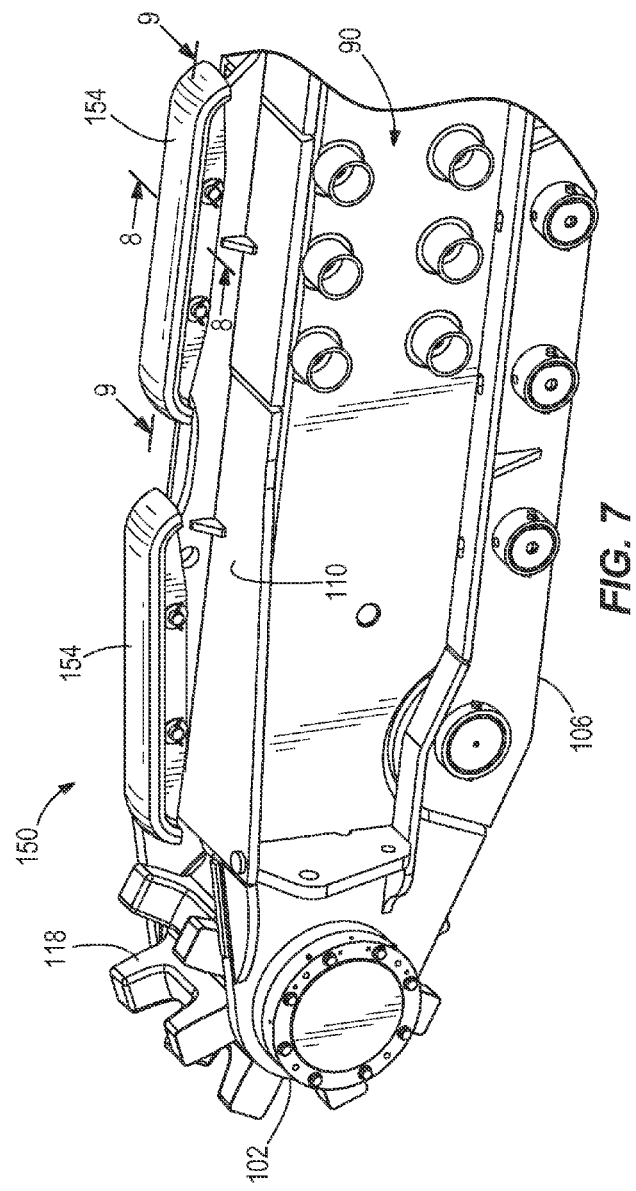
FIG. 7 is a perspective view of a portion of a track frame including a guide rail assembly.

FIG. 7 illustrates a guide rail assembly 150 extending along an upper portion 110 of the track frame 90. In the illustrated embodiment, the guide rail assembly 150 includes multiple rail portions 154. In one embodiment, the track frame 90 includes four rail portions 154. In other embodiments, the track frame 90 may include fewer or more rail portions 154, and the rail portions 154 may be coupled to the track frame 90 in a different manner. Each rail portion 154 has an elongated shape and is aligned such that a longitudinal axis of the rail portion 154 is parallel to the direction of travel of the shoes 94. Stated another way, the rail portions 154 are aligned in an end-to-end configuration such that all of the rail portions 154 extend along a common plane. In the illustrated embodiment, each rail portion 154 is independently coupled to the upper portion 110 of the track frame 90 (e.g., by a bolted connection) such that each rail portion 154 can be removed and replaced without requiring disassembly of any adjacent rail portions 154. In other embodiments, the guide rail assembly 150 may be coupled to the frame 90 in a different manner.

Figure 8:
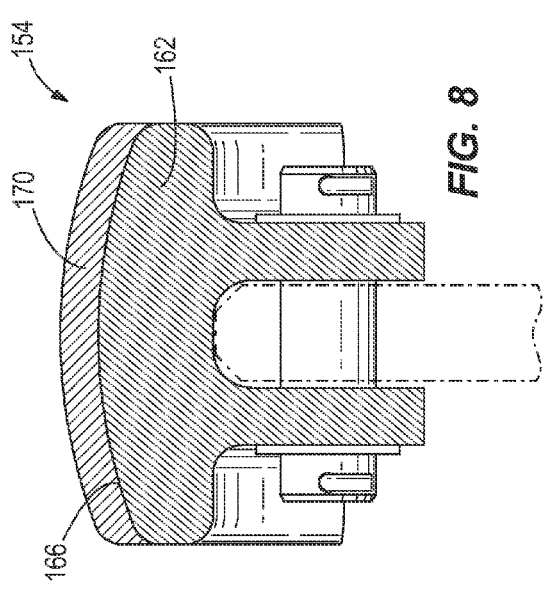
FIG. 8 is a section view of a guide rail portion viewed along section 8-8 of FIG. 7.
Figure 9:
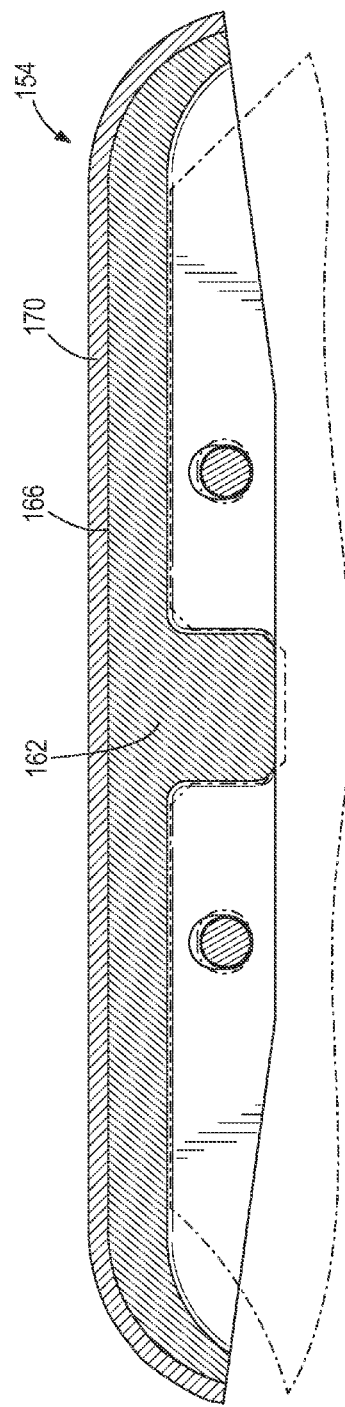
FIG. 9 is a section view of the guide rail portion viewed along section 9-9 of FIG. 7.

Referring now to FIGS. 8 and 9, each guide rail portion 154 includes a base 162 defining an outer surface 166 and a coating 170 coupled to the outer surface 166. In one embodiment, the coating 170 is a polymer-blend bonded to the outer surface 166, the coating 170 follows the same profile as the rail portion 154, and has a uniform, predetermined thickness. The coating 170 is bonded to the base 162 such that the bond is stronger than the coating 170 itself, and the coating 170 mimics the specialized profile of the base 162. In other embodiments, the coating 170 may also be attached mechanically by forming various features (e.g., small holes, recesses, and/or grooves) on the outer surface 166 in order to provide a stronger attachment between the coating 170 and the base 162.

In one embodiment, the coating 170 is formed from polyurethane. In one embodiment, the coating 170 is formed from KAS 311005D polyurethane. In one embodiment, the coating 170 is formed from Type 6M Nylon. In one embodiment, the coating 170 is formed from a Teflon polymer. In one embodiment, the coating 170 is formed from a polyurethane (which may include KAS 311005D) impregnated with a lubricative medium.

Referring again to FIG. 3, the guide rail assembly 150 engages the roller path area 142 of the shoes 94 as the shoes 94 are driven along the upper run of the track 92. The selection of the coating material at least partially depends on the loads and conditions to which the shoe 94 is subjected. The coating material provides a low coefficient of friction and lower hardness than the crawler shoe 94, even before the shoe 94 is completely work-hardened. The coating 170 provides lubricative engagement between the shoe 94 and the rail portion 154, reducing wear on the crawler shoe's roller path area 142 during the work-hardening period. The coating 170 has a life that matches or exceeds the work-hardening period such that, if the coating 170 were to wear off, the outer surface 166 of the base 162 would support the crawler shoes 94 after the shoes 94 have achieved a hardness exceeding the hardness of the base 162.

Furthermore, the coating 170 may be configured to significantly exceed the work-hardening period in order to decrease friction between the guide rail assembly 150 and the shoes 94, thereby facilitating more efficient operation of the track 92. In addition, many shoes 94 are also made of a manganese alloy having a similar hardness to the base 162 of the rail portions 154. Even after the shoe 94 is work-hardened, the wear rate of the shoe 94 is proportional to the hardness of the shoe 94 and the base 162 of the rail portion 154. Thus, providing a coating 170 having a lower hardness reduces the wear on the crawler shoe 94 and reduces the frequency of replacing shoes 94.

FIGS. 10 and 11 illustrate another embodiment of the shoe 494 in which the roller path area 542 includes a surface 572 (FIG. 11) and a plurality of peening pads or protrusions 574 (FIG. 11) extending outwardly from the surface 572. As the rollers 126 exert a compressive force on the roller path area 542, the protrusions 574 wear down, thereby facilitating material flow and work hardening of the shoe 494. In addition, the roller path area 542 is formed as a parallelogram, including a leading edge forming an acute angle relative to a front edge of the shoe 94 and a trailing edge parallel to the leading edge and forming an acute angle relative to a rear edge of the shoe 494. The structure of the shoe 494 is described in U.S. patent application Ser. No. 14/285,255, filed May 22, 2014, the entire contents of which is hereby incorporated by reference.

Figure 12:
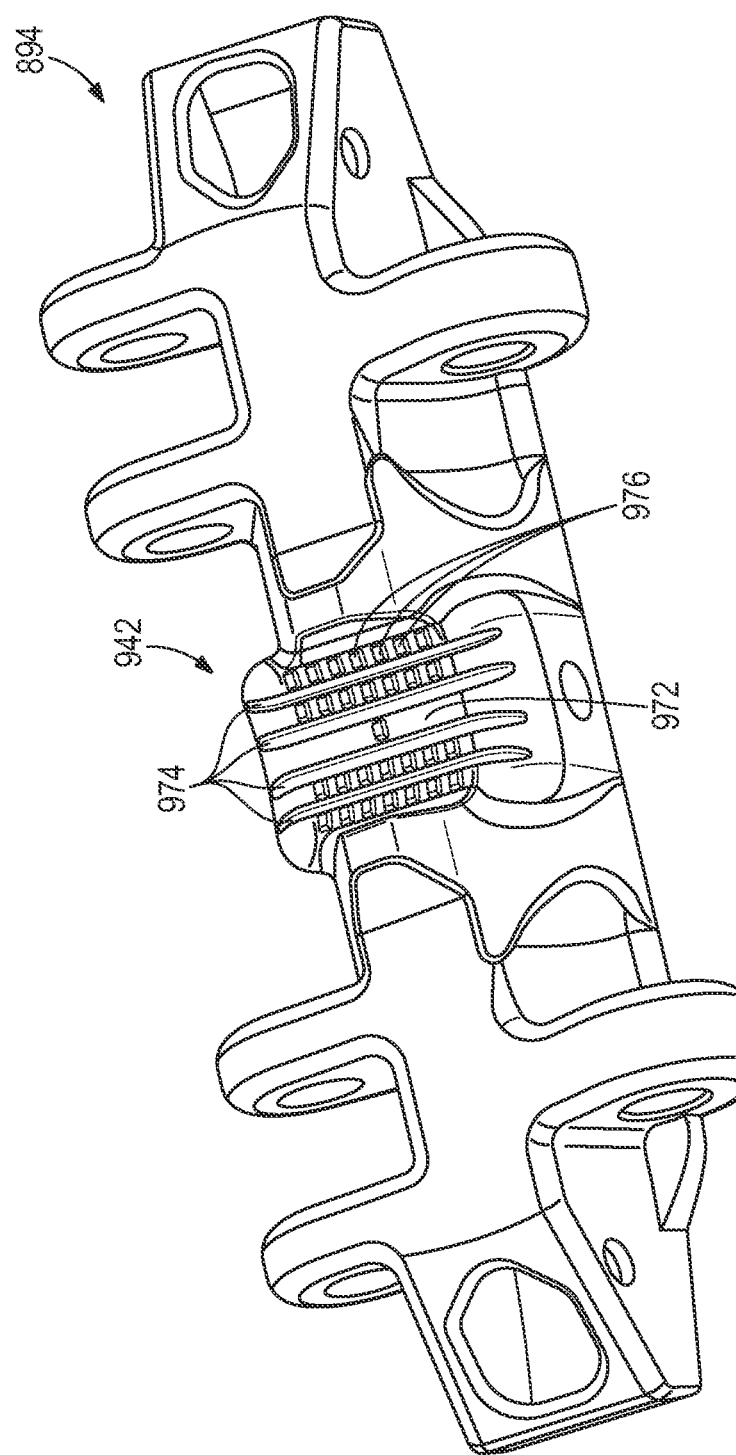
FIG. 12 is a perspective view of a crawler shoe according to another embodiment.

Similarly, FIG. 12 illustrates another embodiment of the shoe 894 in which the roller path area 942 includes a surface 972, ridges 974 extending outwardly from the surface 972 and parallel to the direction of travel, and protrusions 976 extending outwardly from the surface 972 and positioned between the ridges 974.

In other embodiments, a similar coating to the coating 170 on the guide rail assembly 150 may also be applied to the outer surface of the pins 128 (FIG. 5) supporting the rollers 126. In other embodiments, the thrust washer 132 between the pin 128 and the roller 126 may be formed from a nylon material.

Thus, the invention may provide, among other things, a guide rail for a crawler track. Although the invention has been described in detail with reference to certain independent embodiments, variations and modifications exist within the scope and spirit of one or more independent aspects of the invention as described.

The invention claimed is:

1. A crawler mechanism comprising:
   a frame including a first end, a second end, a first side extending between the first end and the second end and proximate a support surface, and a second side;
   a track including a plurality of shoes coupled together and supported for movement relative to the frame along a direction of travel, each shoe including a first end, a second end, and an intermediate portion positioned between the first end and the second end, the intermediate portion having a shoe hardness;
   a sprocket rotatably coupled to the first end of the frame, the sprocket driving the plurality of shoes to move along the second side of the frame;
   a guide rail coupled to the second side of the frame and including a base having an outer surface and a coating bonded to the outer surface, the outer surface of the base having a base hardness, the coating contacting the intermediate portion of the shoes as the shoes move along the second side of the frame, the coating having a coating hardness less than the shoe hardness; and
   a roller supported by the frame for rotation about an axis transverse to the direction of travel of the plurality of shoes, the roller positioned adjacent the first side of the frame and exerting a compressive force on the intermediate portion of each shoe, wherein the compressive force work hardens the shoe during a work-hardening period,
   wherein the shoe hardness of the intermediate portion is initially less than the base hardness, wherein after the work-hardening period the shoe hardness of the intermediate portion is equal to or greater than the base hardness.

2. The crawler mechanism of claim 1, wherein the coating is composed of polyurethane.

3. The crawler mechanism of claim 2, wherein the coating is composed of polyurethane impregnated with a lubricative medium.

4. The crawler mechanism of claim 1, wherein the intermediate portion of each shoe includes a wear surface and at least one protrusion extending outwardly from the wear surface, wherein wear on the protrusion facilitates work hardening of the shoe.

5. The crawler mechanism of claim 1, wherein the coating has a thickness and a hardness to resist wear for at least the duration of the work-hardening period of the shoe.

6. The crawler mechanism of claim 1, wherein the roller is supported for rotation by a pin aligned with the axis of rotation of the roller, each roller defining an internal bore and each pin defining an outer surface having a polymeric coating engaging the internal bore.

7. The crawler mechanism of claim 1, wherein the roller is supported for rotation by a pin aligned with the axis of rotation of the roller, wherein a nylon thrust washer is positioned between the roller and the pin.

8. The crawler mechanism of claim 1, wherein the guide rail includes multiple portions aligned with one another along a line parallel to the direction of travel, each portion being coupled to the frame independent of the other portions.

9. The crawler mechanism of claim 1, wherein the guide rail is removably coupled to the frame.

10. The crawler mechanism of claim 1, wherein at least a portion of the coating remains on the outer surface of the base for the duration of the work-hardening period of the plurality of shoes, the coating configured to wear away after the work-hardening period of the plurality of shoes.

11. A crawler mechanism comprising:
    a frame including a first end and a second end;
    a first sprocket supported for rotation relative to the frame;
    a second sprocket rotatably coupled to the second end of the frame;
    a plurality of rollers rotatably coupled to a lower portion of the frame, the rollers aligned with one another such that all of the rollers rotate in a common plane;
    a track including a plurality of shoes coupled together and driven by at least one of the first sprocket and the second sprocket for movement in a direction parallel to the common plane of the rollers, the track defining an upper run and a lower run, the lower run positioned adjacent the rollers, each shoe including a wear portion contacting the rollers as the shoe moves along the lower run, the wear portion of each shoe having a shoe hardness; and
    a guide rail assembly coupled to the frame and positioned adjacent the upper run of the track, the guide rail assembly including a base having an outer surface and a coating bonded to the outer surface, the outer surface of the base having a base hardness, the coating engaging the wear portion of each shoe as the shoe moves along the upper run, wherein each roller exerts a compressive force on the wear portion of each shoe, the compressive force work hardening each shoe during a work-hardening period, and wherein the shoe hardness is initially less than the base hardness, and after the work-hardening period the shoe hardness is equal to or greater than the base hardness.

12. The crawler mechanism of claim 11, wherein the coating has a coating hardness less than the shoe hardness.

13. The crawler mechanism of claim 11, wherein the coating is composed of polyurethane.

14. The crawler mechanism of claim 13, wherein the coating is composed of polyurethane impregnated with a lubricative medium.

15. The crawler mechanism of claim 11, wherein each wear portion includes a wear surface and at least one protrusion extending outwardly from the wear surface, wherein the rollers exert a compressive force on the protrusion to facilitate work hardening of the shoe.

16. The crawler mechanism of claim 11, wherein the coating has a thickness and a hardness to resist wear for at least the duration of the work-hardening period of the shoe.

17. The crawler mechanism of claim 11, wherein each roller is supported for rotation by a pin oriented transverse to the common plane of the rollers, each roller defining an internal bore and each pin defining an outer surface having a polymeric coating engaging the internal bore.

18. The crawler mechanism of claim 11, wherein the guide rail assembly includes multiple portions aligned with one another such that all of the portions lie in a common plane, each portion being removably coupled to the frame independent of the other portions.

19. The crawler mechanism of claim 11, wherein at least a portion of the coating remains on the outer surface of the base for the duration of the work-hardening period of the plurality of shoes, the coating configured to wear away after the work-hardening period of the plurality of shoes.

20. A frame for a crawler mechanism including a continuous track, the frame comprising:

a first end supporting a first sprocket for driving the continuous track;

a second end supporting a second sprocket;

a first side extending between the first end and the second end and positioned proximate a support surface, the first side including a plurality of rollers supported for rotation, the rollers being aligned with one another such that all of the rollers rotate in a common plane extending between the first end and the second end; and a guide rail assembly defining a second side extending at least partially between the first sprocket and the second sprocket, the guide rail assembly including a base having an outer surface and a coating bonded to the outer surface, the outer surface having a base hardness and the coating having a coating hardness less than the base hardness.

21. The frame of claim 20, wherein the guide rail assembly includes multiple portions aligned with one another such that all of the portions lie in a common plane, each portion being removably coupled to the frame independent of the other portions.

22. The frame of claim 20, wherein the coating is composed of polyurethane.

23. The frame of claim 20, wherein the coating has a thickness and a hardness such that the coating is configured to resist wear for at least the duration of a work-hardening period of the track.

24. The frame of claim 20, wherein each roller is supported for rotation by a pin oriented transverse to the common plane of the rollers, each roller defining an internal bore and each pin defining an outer surface having a polymeric coating engaging the internal bore.

25. The frame of claim 20, wherein at least a portion of the coating is configured to remain on the outer surface of the base during a work-hardening period of the track, the coating configured to wear away after the work-hardening period of the track.

26. The frame of claim 20, wherein the base hardness is configured to be greater than an initial hardness of the track.

* * * * *